United States Patent
Datsyuk et al.

(10) Patent No.: US 12,077,664 B2
(45) Date of Patent: Sep. 3, 2024

(54) HEAT-CURABLE BIOBASED CASTING COMPOSITION, SHAPED ARTICLE PRODUCED THEREFROM AND PROCESS FOR PRODUCING SUCH A SHAPED ARTICLE

(71) Applicant: Schock GmbH, Regen (DE)

(72) Inventors: Vitaliy Datsyuk, Zwiesel (DE); Adam Orendorz, Zwiesel (DE); Oskar Achatz, Bischofsmais (DE)

(73) Assignee: SCHOCK GMBH, Regen (DE)

( * ) Notice: Subject to any disclaimer, the term of this patent is extended or adjusted under 35 U.S.C. 154(b) by 97 days.

(21) Appl. No.: 17/381,978

(22) Filed: Jul. 21, 2021

(65) Prior Publication Data

US 2022/0025169 A1    Jan. 27, 2022

(30) Foreign Application Priority Data

Jul. 22, 2020   (DE) ............... 10 2020 119 386.6

(51) Int. Cl.
| | | |
|---|---|---|
| *C08L 33/12* | (2006.01) | |
| *B29C 45/00* | (2006.01) | |
| *C08L 1/28* | (2006.01) | |
| *B29K 33/00* | (2006.01) | |
| *B29K 509/02* | (2006.01) | |

(52) U.S. Cl.
CPC .......... *C08L 33/12* (2013.01); *B29C 45/0001* (2013.01); *C08L 1/28* (2013.01); *B29K 2033/12* (2013.01); *B29K 2509/02* (2013.01); *C08L 2203/30* (2013.01); *C08L 2205/025* (2013.01); *C08L 2205/03* (2013.01); *C08L 2207/20* (2013.01); *C08L 2207/322* (2013.01)

(58) Field of Classification Search
CPC .......... C08L 33/12; C08L 33/08; C08L 33/10; C08L 1/28; C08L 2205/03; C08L 2207/20; C08L 2207/322; C08L 2203/30; C08L 2205/025; B29K 2033/12; B29C 45/0001
See application file for complete search history.

(56) References Cited

U.S. PATENT DOCUMENTS

| | | | |
|---|---|---|---|
| 5,218,013 A | 6/1993 | Schock | |
| 5,519,083 A | 5/1996 | Ashton | |
| 5,710,204 A | 1/1998 | Harke | |
| 6,451,910 B1 * | 9/2002 | Koyanagi | C04B 26/06 524/425 |
| 6,664,314 B1 | 12/2003 | Hajek | |
| 8,968,975 B2 | 3/2015 | Goan | |
| 2008/0132607 A1 | 6/2008 | Reichenberger | |
| 2014/0080967 A1 | 3/2014 | Hayes | |
| 2021/0087383 A1 | 3/2021 | Datsyuk | |

FOREIGN PATENT DOCUMENTS

| | | | |
|---|---|---|---|
| AU | 2020220140 A1 * | 4/2021 | ......... B29C 39/006 |
| CA | 1331426 C | 8/1994 | |
| DE | 3832351 A1 | 4/1990 | |
| DE | 19812123 A1 | 9/1999 | |
| DE | 102019125777 A1 | 3/2021 | |
| EP | 0753017 B1 | 5/1998 | |
| EP | 1826241 A1 | 8/2007 | |
| EP | 2409959 B1 | 5/2014 | |
| EP | 3272777 A1 | 1/2018 | |
| EP | 3686227 A1 | 7/2020 | |
| EP | 3797959 A1 | 3/2021 | |
| EP | 3686227 B1 | 7/2021 | |
| IL | 276837 A1 | 3/2021 | |
| IT | 201800021340 A1 | 6/2020 | |
| JP | H03503386 A1 | 8/1991 | |
| JP | H07501099 A | 2/1995 | |
| JP | 2014153528 A1 | 8/2014 | |
| JP | 2021050335 A1 | 4/2021 | |
| RU | 2396286 C2 | 8/2010 | |
| WO | 1999055633 A1 | 11/1999 | |
| WO | 2008001097 A1 | 1/2008 | |

(Continued)

OTHER PUBLICATIONS

Russian Patent Office issued Office Action on Jan. 24, 2022 regarding parallel Russia Patent Application No. 2021121365, 14 pages.
Japanese Patent Office issued an Office Action on Jul. 26, 2022 regarding parallel Japanese Patent Application No. 2021-116245, 5 pages.
Australian Patent Office issued Office Action on Jun. 24, 2022 regarding parallel Australian Patent Application No. 2021204815, 4 pages.
Canadian Patent Office issued Office Action on Jun. 23, 2022 regarding parallel Canadian Patent Application No. 3125721, 6 Pages.
Japanese Patent Office issued an Office Action on Nov. 29, 2022 regarding parallel Japanese Patent Application No. 2021-116245, 4 pages.

(Continued)

*Primary Examiner* — Robert D Harlan
(74) *Attorney, Agent, or Firm* — LUCAS & MERCANTI, LLP; Klaus P. Stoffel

(57) ABSTRACT

A heat-curable biobased casting composition, including
(a) a mixture of two or more monofunctional acrylic and/or methacrylic monomers, wherein one or more monomers are derived from recycled material and one or more monomers are of vegetable or animal origin,
(b) one or more polyfunctional acrylic and/or methacrylic biomonomers of vegetable or animal origin,
(c) one or more polymers or copolymers selected from polyacrylates, polymethacrylates, polyols, polyesters derived from recycled material or of vegetable or animal origin,
(d) inorganic filler particles of natural origin,
wherein the proportion of the monofunctional acrylic and/or methacrylic monomers and of the polyfunctional acrylic and methacrylic biomonomers is 10-40% by weight, the proportion of the polymer(s) or copolymer(s) is 1-16% by weight and the proportion of the inorganic filler particles is 44-89% by weight.

19 Claims, No Drawings

(56) References Cited

FOREIGN PATENT DOCUMENTS

WO          2016022960 A2    2/2016

OTHER PUBLICATIONS

Indian Patent Office issued a First Examination Report on Feb. 24, 2023 regarding parallel Indian Patent Application No. 202144032829, 7 pages.
German Office Action Dated Mar. 22, 2021, DE 10 2020 119 386.6, 6 Pages.
IUPAC Recommendations 2012, Pure Appl. Chem. vol. 84, No. 2, pp. 377-410, 2012 "Terminology for biorelated polymers and applications (IUPAC Recommendations 2012)" (http://publications.iupac.org/pac/pdf/2012/pdf/8402x0377.pdf).
European Patent Office issued a Search Report on Dec. 10, 2021 regarding parallel European Patent Application No. 21180867.0, 7 pages.
Chinese Patent Office issued an Office Action on Oct. 26, 2023 regarding parallel Chinese Patent Application No. 202110830275.8, 6 pages.
Excerpt of German Patent and Trademark Office issued Office Action dated Nov. 27, 2023 regarding parallel German Patent Application No. 102020119386.6, 1 page.
Israelian Patent Office issued an examination report on Jul. 10, 2024 regarding the parallel Israelian patent application, 4 pages.

* cited by examiner

HEAT-CURABLE BIOBASED CASTING COMPOSITION, SHAPED ARTICLE PRODUCED THEREFROM AND PROCESS FOR PRODUCING SUCH A SHAPED ARTICLE

CROSS-REFERENCE TO RELATED APPLICATIONS

The present application claims priority of DE 10 2020 119 386.6, filed Jul. 22, 2020, the priority of this application is hereby claimed, and this application is incorporated herein by reference.

BACKGROUND OF THE INVENTION

The invention relates to a heat-curable biobased casting composition suitable for producing a shaped article composed of a polymer matrix formed from the polymerized casting composition comprising filler particles embedded therein. The invention further relates to shaped articles produced from such a casting composition, for example in the form of a kitchen sink, a washbasin, a worktop, a bathtub or a shower tray or a worktop, wherein the polymerized casting composition forms a biocomposite material composed of a polymer matrix comprising embedded filler particles.

The biocomposite material according to the invention/the shaped article according to the invention is produced by initially dispersing inorganic filler particles in a solution of at least one bio- and/or recycled (co)polymer in a mixture of recycled and biobased mono- and polyfunctional monomers to produce the casting composition according to the invention, subsequently injecting the casting composition into a mold, filling the mold cavity and fixing the material according to the cavity shape using heat through the thermally induced polymerization of the monofunctional biomonomers with the polyfunctional biomonomers.

It is known to produce kitchen sinks for example from a polymerized casting composition. Such a kitchen sink accordingly comprises a polymer matrix in which filler particles are embedded for establishing desired properties. The casting composition is produced using suitable crosslinkable polymers, wherein polymers of petrochemical origin, i.e. crude oil-based polymers, are used. Kitchen sinks produced in such a way do show very good mechanical properties and are thermally stable over a large temperature range. Nevertheless, the use of such polymers is disadvantageous not least for reasons of sustainability (environmental protection and resource conservation).

SUMMARY AND DETAILED DESCRIPTION OF THE INVENTION

The problem addressed by the present invention is accordingly that of providing an improved casting composition.

What is provided to solve the problem is a heat-curable biobased casting composition comprising:
(a) a mixture of two or more monofunctional acrylic and/or methacrylic monomers, wherein one or more monomers are derived from recycled material and one or more monomers are of vegetable or animal origin,
(b) one or more polyfunctional acrylic and/or methacrylic biomonomers of vegetable or animal origin,
(c) one or more polymers or copolymers selected from polyacrylates, polymethacrylates, polyols, polyesters derived from recycled material or of vegetable or animal origin,
(d) inorganic filler particles of natural origin, wherein the proportion of the monofunctional acrylic and/or methacrylic monomers and of the polyfunctional acrylic and methacrylic biomonomers is 10-40% by weight, the proportion of the polymer(s) or copolymer(s) is 1-16% by weight and the proportion of the inorganic filler particles is 44-89% by weight.

The casting composition according to the invention has the feature that it is composed largely of biological/natural materials in particular in respect of the employed crosslinking substances. According to the invention a mixture of different monofunctional monomers is employed. According to the invention the employed mixture of the monofunctional acrylic and methacrylic monomers is composed partly of recycled material and partly of monomers of vegetable or animal origin, wherein at least one monomer is derived from recycled material and at least one monomer is biobased, i.e. of vegetable or animal origin. Petrochemically obtained polymers are thus hardly employed, with the exception of the recycled proportion which is, however, optionally also composed of recycled biobased material. In any case no petrochemical-based virgin material is employed within the scope of the recycled monofunctional monomer proportion. The polyfunctional monomers employed are exclusively monomers of vegetable or animal origin. Provided that monomers, either monofunctional or polyfunctional monomers, of vegetable or animal origin are employed these may be referred to as "biomonomers", wherein a biomonomer is a monomer of a biopolymer. The term "polyfunctional" comprises bi-, tri- and higher-functional biomonomers.

The employed polymers or copolymers are preferably likewise of purely vegetable or animal origin, i.e. these substances are not of petrochemical origin either. However, it is also possible, alternatively to the use of substances of vegetables/animal origin, to use polymers or copolymers derived from recycling material. While this material is usually of petrochemical origin, no virgin material is employed but rather an existing but recycled material is reused which is likewise advantageous from an environmental standpoint. The use of biomonomers and recycling material ensures that in the casting composition according to the invention even petrochemical-based substances hitherto employed in the binder are completely replaced by sustainable materials. It is naturally also preferable for polymers/copolymers of purely vegetable or animal origin to be used, thus affording in this case, with the exception of the monofunctional recycled monomer proportion, a casting composition composed completely of natural materials since the fillers too are of purely natural origin as described. The shaped article produced from the casting composition according to the invention is consequently a shaped bio-article composed predominantly of biological, i.e. natural, materials. The production of the biocomposite material from the filler particles and the crosslinkable materials produced from renewable sources reduces the consumption of petrochemically produced materials and thus also crude oil consumption and has a positive effect on the environment.

Monofunctional acrylic and/or methacrylic biomonomers of vegetable or animal origin, polyfunctional acrylic and/or methacrylic biomonomers of vegetable or animal origin and biobased polymers or copolymers selected from polyacrylates, polymethacrylates, polyols, polyesters of vegetable or animal origin are in the present case to be understood as meaning those in accordance with IUPAC Recommendations 2012, Pure Appl. Chem. Vol. 84, No. 2, pp. 377-410, 2012 "Terminology for biorelated polymers and applications (IUPAC Recommendations 2012)" (http://publications.iupac.org/pac/pdf/2012/pdf/8402x0377.pdf) where according to the definition on page 381 the term "biobased" is defined as "composed or derived in whole or in part of biological products issued from the biomass (including plant, animal, and marine or forestry materials" i.e. the use of a biobased (vegetable or animal) precursor or starting material also results in the production of a corresponding biobased monomer/polymer/copolymer of vegetable or animal origin.

Despite the use of predominantly natural materials for producing the casting composition/shaped article, i.e. the kitchen sink for example, it has surprisingly been found that the shaped article exhibits very good and in some cases even better mechanical properties, especially in terms of impact strength or scratch resistance, compared to a known casting composition produced from petrochemically obtained crosslinking materials or such a shaped article.

The production of biocomposite shaped articles, such as kitchen sinks, shower trays, bathtubs, washbasins and worktops, from high-quality mono- and polyfunctional bioacrylate and bio-methacrylate monomers makes it possible to combine high technical performance requirements and an elevated biorenewable carbon content (BRC) (proportion of renewable carbon/biobased carbon content) in products. There are a multiplicity of different bioavailable sources for producing mono- and polyfunctional bioacrylate and biomethacrylate monomers, for example vegetable oil, animal fat, wood. A BRC in biomonomers of up to 90% can be achieved.

The shaped article made of the biocomposite material is composed of the mixture of the inorganic filler which has been embedded in the polymer matrix via a crosslinking polymerization process of the mono- and polyfunctional monomers and achieves a high level of sustainability through the use of the renewable raw materials.

According to the invention the weight ratio of monofunctional monomers to polyfunctional biomonomers should be 2:1 1 to 80:1, preferably 4:1 to 70:1, in particular 5:1 to 60:1.

A monofunctional monomer in the form of a recycled acrylate or a biobased acrylate of vegetable or animal origin may be used. This may be selected from n-butyl acrylate, methyl acrylate, ethyl acrylate, tert-butyl acrylate, isobutyl acrylate, isodecyl acrylate, dihydrodicyclopentadienyl acrylate, ethyl diglycol acrylate, heptadecyl acrylate, 4-hydroxybutyl acrylate, 2-hydroxyethyl acrylate, hydroxyethylcaprolactone acrylate, polycaprolactone acrylate, hydroxypropyl acrylate, lauryl acrylate, stearyl acrylate, tertiobutyl acrylate, 2-(2-ethoxy)ethyl acrylate, tetrahydrofurfuryl acrylate, 2-phenoxyethyl acrylate, ethoxylated 4-phenyl acrylate, tri methylcyclohexyl acrylate, octyldecyl acrylate, tridecyl acrylate, ethoxylated 4-nonylphenol acrylate, isobornyl acrylate, cyclic tri methylolpropane formal acrylate, ethoxylated 4-lauryl acrylate, polyester acrylate, stearyl acrylate, hyper branched polyester acrylates, melamine acrylate, silicone acrylate, epoxy acrylate.

It is further possible to employ a monofunctional monomer in the form of a recycled methacrylate or a biobased methacrylate of vegetable or animal origin. This may be selected from methyl methacrylate, ethyl methacrylate, n-butyl methacrylate, isobutyl methacrylate, tert-butyl methacrylate, behenyl methacrylate, behenyl polyethylene glycol methacrylate, cyclohexyl methacrylate, isodecyl methacrylate, 2-ethylhexyl methacrylate, lauryl methacrylate, stearyl methacrylate, stearyl polyethylene glycol methacrylate, isotridecyl methacrylate, ureido methacrylate, tetrahydrofurfuryl methacrylate, phenoxyethyl methacrylate, 3,3,5-trimethylcyclohexanol methacrylate, isobornyl methacrylate, methoxypolyethylene glycol methacrylate, glycidyl methacrylate, hexylethyl methacrylate, glycerol formal methacrylate, lauryl tetradecyl methacrylate, C17,4-methacrylate.

A polyfunctional biomonomer may be employed in the form of a biobased acrylate, i.e. an acrylate of vegetable or animal origin. This may be selected from 1,6-hexanediol diacrylate, polyethylene glycol diacrylate, tetraethylene glycol diacrylate, tripropylene glycol diacrylate, polybutadiene diacrylate, 3-methyl-1,5-pentanediol diacrylate, ethoxylated bisphenol A diacrylate, dipropylene glycol diacrylate, ethoxylated hexanediol diacrylate, 1,10-decanediol diacrylate, esterdiol diacrylate, alkoxylated diacrylate, tricyclodecane dimethanol diacrylate, propoxylated neopentyl glycol diacrylate, pentaerythritol tetraacrylate, tri methylolpropane triacrylate, ditrimethylolpropane tetraacrylate, tris(2-hydroxyethyl)isocyanurate triacrylate, dipentaerythritol pentaacrylate, ethoxylated tri methylolpropane triacrylate, pentaerythritol triacrylate, propoxylated tri methylolpropane triacrylate, ethoxylated pentaerythritol tetraacrylate, propoxylated glyceryl triacrylate, aliphatic urethane acrylate, aliphatic urethane hexaacrylate, aliphatic urethane triacrylate, aromatic urethane diacrylate, aromatic urethane triacrylate, aromatic urethane hexaacrylate, polyester hexaacrylate, epoxidized soybean oil diacrylate.

It is further possible to employ a polyfunctional biomonomer in the form of a biobased methacrylate, i.e. a methacrylate of vegetable or animal origin. This may be selected from triethylene glycol dimethacrylate, ethylene glycol dimethacrylate, polyethylene glycol dimethacrylate, 1,4-butanediol dimethacrylate, diethylene glycol dimethacrylate 1,6-hexanediol dimethacrylate, 1,10-decanediol dimethacrylate, 1,3-butylene glycol dimethacrylate, ethoxylated bisphenol A dimethacrylate, tricyclodecanedimethanol dimethacrylate, trimethylolpropane trimethacrylate.

According to the invention the weight ratio of mono- or polyfunctional acrylates and/or methacrylates to the polymer(s) or copolymer(s), in particular selected from polyacrylates, polymethacrylates, polyols or polyesters, should be 90:10 to 60:40, preferably 85:15 to 70:30.

The inorganic filler particles are also natural, i.e. of biological origin, and not synthetically produced. They may be selected from $SiO_2$, $Al_2O_3$, $TiO_2$, $ZrO_2$, $Fe_2O_3$, $ZnO$, $Cr_2O_5$, carbon, metals or metal alloys, wherein mixtures of two or more different types of filler particles may also be used. The mixing ratio may be any desired ratio.

The inorganic filler particles should have a particle size of 0.010 to 8000 μm, preferably 0.05 to 3000 μm and in particular 0.1 to 1300 μm. The inorganic filler particles should further have an aspect ratio of 1.0 to 1000 (length: width of the individual particles).

For easy processability the viscosity of the obtained casting composition should be adjusted such that the casting composition may be injected under pressure into a mold to fully occupy its mold cavity using a suitable injection apparatus.

In addition to the casting composition the invention relates to a shaped article produced from the casting composition according to the invention. Since the casting composition contains biomonomers, biopolymers and biocopolymers the shaped article is consequently a biocomposite article, for example a biocomposite kitchen sink or the like.

Different shaped article types may thus be produced. Thus the shaped article may be a kitchen sink, a shower tray, a washstand, a bathtub, a worktop or a floor, wall or ceiling panel, wherein this list is nonexhaustive.

As described hereinabove it has been found that despite the use of biobased starting materials of which the casting composition is composed, the obtained shaped articles exhibit very good properties, in particular mechanical properties. The polymerized biocomposite material of the shaped article should have an impact strength of 2 to 5 mJ/mm$^2$ as well as thermal stability from −30° C. to 300° C.

An above-described advantage of the invention is that the use of one, two or more monofunctional biomonomers makes it possible to vary the thermal, mechanical and surface properties of the end product, i.e. of the finished shaped article, according to the product requirements. Impact strength may be improved through addition of bio-lauryl methacrylate monomer with good flexibility for example.

The concentration of the bio-lauryl methacrylate in the biocomposite material is preferably about 0.5% to about 10% by weight, in particular from 0.7% to 5.0% by weight. It has been found that a small amount of flexible bio-lauryl methacrylate results in an improvement in impact strength.

A further above-described advantage of the invention is that the thermal stability of the finished shaped article may be improved for example by addition of bio-isobornyl methacrylate with elevated thermal stability.

The concentration of the bio-isobornyl methacrylate in the biocomposite material is preferably about 1.0% to about 20% by weight, in particular from 2.0% to 17.0% by weight. It has been found that a small amount of bio-isobornyl methacrylate results in an improvement in scratch resistance.

A further advantage of the invention is that aging resistance may be improved for example by addition of bio-isobornyl acrylate monomer with improved weathering resistance. The concentration of the bio-isobornyl acrylate in the biocomposite material is preferably about 1.0% to about 10% by weight, in particular from 2.0% to 7.0% by weight. It has been found that a small amount of bio-isobornyl acrylate results in an improvement in aging resistance.

A further advantage of the invention is that chemical stability is improved for example by addition of bio-(1,10-decanediol diacrylate) bifunctional monomer. The concentration of the bio-(1,10-decanediol diacrylate) in the biocomposite material is preferably about 0.15% to about 10% by weight, in particular from 0.3% to 5.0% by weight. It has been found that a small amount of bio-(1,10-decanediol diacrylate) results in an improvement in chemical stability.

A further advantage of the invention is that the filler dispersion is improved for example by addition of bio-(propoxylated (3) glyceryl triacrylate) trifunctional monomer on account of very good filler wetting. The concentration of the bio-(propoxylated (3) glyceryl triacrylate) in the biocomposite material is preferably about 0.1% to about 5% by weight, in particular from 0.3% to 2.0% by weight. It has been found that a small amount of bio-(propoxylated (3) glyceryl triacrylate) results in an improvement in the filler distribution in a matrix and in improved thermal and mechanical properties.

A further advantage of the invention is that the abrasion resistance of the biocomposite composition of the shaped article may be improved for example by addition of bio-polyethylene glycol dimethacrylate bifunctional monomer with elevated abrasion resistance. The concentration of the bio-polyethylene glycol dimethacrylate in the biocomposite material is preferably from about 0.1% to about 10% by weight, in particular from 0.3% to 5.0% by weight. It has been found that a small amount of bio-polyethylene glycol dimethacrylate results in an improvement in abrasion resistance.

A further advantage of the invention is that the scratch resistance of the shaped article may be improved for example by addition of bio-dipentaerythritol pentaacrylate polyfunctional monomer with elevated scratch resistance. The concentration of the bio-dipentaerythritol pentaacrylate in the biocomposite material is preferably about 0.1% to about 7% by weight, in particular from 0.3% to 5.0% by weight. It has been found that a small amount of bio-dipentaerythritol pentaacrylate results in an improvement in scratch resistance.

Inorganic fillers may be employed in the form of $SiO_2$ in the form of quartz particles, cristobalite particles, pyrogenic silica particles, aerated silica particles, silica fibers, silica fibrils, silicate particles, such as phyllosilicates; $Al_2O_3$ particles, $TiO_2$ particles, $Fe_2O_3$ particles, ZnO particles, $Cr_2O_5$ particles, carbon particles, carbon nanotube particles, graphite particles or graphene particles.

In order to obtain the exceptionally stable dispersion of the inorganic filler in the polymer matrix the monomer mixture may contain a biobased composition of polymers and/or copolymers made of recycled or biobased resources to establish a suitable viscosity.

The invention further relates to a process for producing a shaped article of the above-described type, in which a casting composition of the likewise above-described type is employed and introduced into a mold in which it polymerizes at a temperature elevated relative to room temperature and the polymerized shaped article is subsequently removed from the mold and cooled.

The temperature during the polymerization should be between 60-140° C., preferably between 75-130° C. and in particular 80-110° C.

Furthermore, the holding time during which the casting composition remains in the mold for polymerization should be between 15-50 min, preferably 20-45 min and in particular 25-35 min.

The production of the shaped article from the heat-curable biobased casting composition is a multistage process comprising the steps of
  production of polymer matrix components
  dispersion of inorganic fillers in a polymer matrix
  crosslinking polymerization of kitchen sinks, washbasins, bathtubs, worktops.

Recited hereinbelow are a plurality of test examples for more particular elucidation of the casting composition according to the invention, of the shaped article according to the invention and of the process according to the invention.

Example 1

Production of Polymer Matrix Components from Different Monofunctional Monomers

Employed components:
(a) Monofunctional monomers:
  Monofunctional biobased monomers:
    Isobornyl methacrylate (IBOMA, Evonik Performance Materials GmbH), lauryl methacrylate (LMA, Arkema France), isobornyl acrylate (IBOA; Miwon Specialty Chemical Co., Ltd), ethyl methacrylate (BCH Brühl Chemikalien Handel GmbH) These components all derive from vegetable or animal origin, for example VISIOMER® Terra IBOMA is produced from pine resin.
  Monofunctional recycled monomer:
    Monofunctional recycled monomer methacrylate (rec.-MMA, Monómeros del Vallés, S.L.)

(b) Polyfunctional monomers:
   1,10-(Decanediol diacrylate) (Arkema France)
(c) Polymers:
   Acrylglas-Feinmahlgut XP 85 (recycled PMMA, Kunststoff-und Farben-GmbH) and Aqualon EC-N100 0100 (biobased ethylcellulose, Ashland Industrie Deutschland GmbH)
(d) Filler:
   $SiO_2$ [80% quartz of particle size 0.06-0.3 mm (Dorfner GmbH); 20% quartz flour of particle size 0.1-0.70 µm (Quarzwerke GmbH) and $TiO_2$ particles (Crystal International B.V.)
(e) Additives:
   Biobased dispersion additives (0.1%) (BYK Chemie GmbH) and thixotropic additives (0.1%) (BYK Chemie GmbH)

The compositions for producing polymer matrices are produced by dissolution of Acrylglas-Feinmahlgut XP 85 (recycled PMMA, Kunststoff-und Farben-GmbH) and Aqualon EC-N100 0100 (biobased ethylcellulose as biopolymer, Ashland Industrie Deutschland GmbH) in the mixture of monofunctional monomers of table 1: Isobornyl methacrylate (Evonik Performance Materials GmbH), lauryl methacrylate (LMA, Arkema France), isobornyl acrylate (Miwon Specialty Chemical Co., Ltd), ethyl methacrylate (BCH Brühl Chemikalien Handel GmbH). The reaction mixture was heated to 40° C. to accelerate the solubility in 100 min to obtain a clear solution. For comparison of the matrix components the compositions were prepared and summarized in table 1:

TABLE 1

| Monofunctional monomers | Sample 1 | Sample 2 | Sample 3 |
|---|---|---|---|
| Recycled methyl methacrylate | 62 | 50 | 35 |
| Lauryl methacrylate | 38 | 38 | |
| Isobornyl acrylate | | | 28 |
| Isobornyl methacrylate | 0 | 12 | 12 |
| Ethyl methacrylate | | | 25 |

All samples from table 1 were employed as solvent for Acrylglas-Feinmahlgut XP 85 and Aqualon EC-N100 011 (95:5) in a ratio of 80:20 to increase the viscosity of the reaction composition (from 120 to 155 cPs, Brookfield Viscometer DVI Prime) followed by an addition of 20% by weight of bio-(1,10-decandiol diacrylate) (Arkema France).

The clear solution of Acrylglas-Feinmahlgut XP85 and Aqualon EC-N100 011 mixture in experiments 1-3 with addition of bio-(1,10-DDDA) was used to disperse a mixture of inorganic fillers (70% by weight) containing 95% by weight of $SiO_2$ [80% quartz of particle size 0.06-0.3 mm (Dorfner GmbH), 20% quartz flour of particle size 0.1-0.70 µm (Quarzwerke GmbH)] and 5% $TiO_2$ particles (Crystal International B.V.). Also added were bio-based dispersion additives (0.1%) (BYK Chemie) and thixotropic additives (0.1% (BYK Chemie). The thus produced casting composition was stirred for 20 minutes (Dispermat AE-3M, VMA-Getzmann GmbH). The casting composition was used to produce a shaped article in the form of a kitchen sink by pouring the casting composition into a mold and polymerizing it for 35 minutes at 110° C.

Mechanical and thermal properties of the kitchen sinks from experiments 1-3.

TABLE 2

| Properties | Sample 1 | Sample 2 | Sample 3 | Comparative sink |
|---|---|---|---|---|
| Impact strength $mJ/mm^2$ | 3.2 | 2.7 | 2.9 | 2.3 |
| Scratch resistance | + | + | + | + |
| Taber abrasion, µg | 10 | 15 | 14 | 12 |
| Heat resistance* | + | + | + | + |
| Temperature change stability** | + | + | + | + |

For impact strength measurements 12 samples having dimensions of 80×6 mm were cut out of the sink. Measurements were performed on a ZwickRoell HIT P instrument.

For scratch resistance measurements a sample (100×100 mm) is cut and the topography before and after scratching was measured (Mitutoyo Surftest SJ 500P).

For the Taber abrasion test a sample (100×100 mm) is cut and the abrasion test performed on an Elcometer 1720 instrument.

* The method is based on the test standard DIN EN 13310 in which the test specimen is placed in the middle of the kitchen sink at 180° C. for 20 min without leaving behind any visible changes in the surface of the sink.

** The method is based on the test standard DIN EN 13310 in which the sink is treated for 1000 cycles with alternating cold and hot water. Hot water, T=90° C., flows into the sink for 90 seconds followed by relaxation for 30 seconds, further followed by a flow of cold water (T=15° C.) for the next 90 seconds. This cycle is terminated with a relaxation for 30 seconds.

The composite material for the comparative sink was produced using organic compounds of petrochemical origin according to patent application DE 38 32 351 A1.

The table shows that all test examples show measured properties which at least correspond to and in most cases are better than those of the known comparative sink made of non-biobased components as far as the monomers and polymers are concerned. Especially the impact toughness is in some cases significantly improved for samples 1-3.

Example 2

Production of Polymer Matrix Components Comprising Different Polyfunctional Monomers Employed components:
(a) Monofunctional monomers:
   Recycled MMA and biobased LMA in the ratio 62:38 (recycled monomer methacrylate (rec.-MMA, Monómeros del Vallés, S.L.) and lauryl methacrylate biomonomer (LMA, Arkema France))
(b) Polyfunctional monomers:
   1,10-(Decanediol diacrylate), propoxylated (3) glyceryl triacrylate (Arkema France), polyethylene glycol dimethacrylate (Arkema France) epoxidized soybean oil diacrylate (Miwon Specialty Chemical Co., Ltd)
(c) Polymer:
   Acrylglas-Feinmahlgut XP 85 (recycled PMMA, Kunststoff-und Farben GmbH) and Aqualon EC-N100 0100 (ethylcellulose, Ashland Industrie Deutschland GmbH)
(d) Filler:
   $SiO_2$ [80% quartz of particle size 0.06-0.3 mm (Dorfner GmbH); 20% quartz flour of particle size 0.1-0.70 µm (Quarzwerke GmbH) and $TiO_2$ particles (Crystal International B.V.)

(e) Additives:
  Biobased dispersion additives (0.1%) (BYK Chemie GmbH) and thixotropic additives (0.1%) (BYK Chemie GmbH)

The compositions for producing polymer matrices are produced by dissolution of Acrylglas-Feinmahlgut XP 85 (recycled PMMA, Kunststoff- and Farben-GmbH) and Aqualon EC-N100 0100 (ethylcellulose, Ashland Industrie Deutschland GmbH) in the mixture of monofunctional monomers rec. MMA and LMA in the ratio 62:38. The reaction mixture was heated to 40° C. to accelerate the solubility to 150 min, followed by addition of the polyfunctional monomers: 1,10-DDDA, propoxylated (3) glyceryl triacrylate (Arkema France), polyethylene glycol dimethacrylate (PEG-DMA, Arkema France), epoxidized soybean oil diacrylate (Miwon Specialty Chemical Co., Ltd), to finalize the composition for forming polymer matrix. For comparison of the matrix components the compositions composed of different polyfunctional monomers were produced and summarized in table 3: The concentration of the polyfunctional monomers is reported in % by weight based on the amount of the monofunctional monomers:

TABLE 3

| Polyfunctional biomonomers | Sample 4 | Sample 5 | Sample 6 |
|---|---|---|---|
| 1,10-Decanediol diacrylate | 14 | | |
| Propoxylated (3) glyceryl triacrylate | 14 | 5 | |
| Polyethylene glycol dimethacrylate | | 10 | 10 |
| Epoxidized soybean oil acrylates | | | 5 |

Mechanical and thermal properties of the kitchen sinks from experiments 4-6.

TABLE 4

| Properties | Sample 4 | Sample 5 | Sample 6 | Comparative sink |
|---|---|---|---|---|
| Impact strength mJ/mm$^2$ | 3.1 | 3.5 | 2.8 | 2.3 |
| Scratch resistance | + | + | + | + |
| Taber abrasion, μg | 15 | 11 | 18 | 12 |
| Heat resistance* | + | + | + | + |
| Temperature change stability** | + | + | + | + |

The measured values of table 4 show that even within these test examples the shaped bodies in some cases exhibit considerably improved mechanical properties, in particular in terms of impact strength and scratch resistance. That is to say the use of the biobased starting materials enables not only an improvement from an environmental perspective but also an improvement especially of the mechanical properties of the shaped article.

Example 3

Production of Polymer Matrix Components Comprising Different Recycling or Biopolymers Employed components:
(a) Monofunctional monomers:
  Recycled MMA and biobased LMA in the ratio 62:38 (recycled monomer methacrylate (rec. MMA, Monómeros del Vallés, S.L.) and lauryl methacrylate (LMA, Arkema France))

Polyfunctional biomonomers:
  Bio-(1,10-decanediol diacrylate) (Arkema France) and propoxylated (3) glyceryl triacrylate (Arkema France) in the ratio 14:14.

(b) Polymer:
  Recycled polymers and biopolymers and biocopolymers: Recycled PMMA (Kunststoff-und Farben-GmbH), Castor oil polymer (D.O.G Deutsche Oelfabrik Ges. f. chem. Erz. mbH & Co.KG)

(d) Filler:
  SiO$_2$ [80% quartz of particle size 0.06-0.3 mm (Dorfner GmbH); 20% quartz flour of particle size 0.1-0.70 μm (Quarzwerke GmbH) and TiO$_2$ particles (Crystal International B.V.)

(e) Additives:
  Biobased dispersion additives (0.1%) (BYK Chemie) and thixotropic additives (0.1%) (BYK Chemie)

The compositions for the production of polymer matrices are produced by dissolution of recycled polymer and/or polymer and/or biocopolymer (recycled PMMA (Kunststoff-und Farben-GmbH), Castor oil polymer (D.O.G Deutsche Oelfabrik Ges. f. chem. Erz. mbH & Co.KG) in the mixture of monofunctional monomers rec. MMA and LMA in the ratio 68:32. The reaction mixture was heated to 40° C. to accelerate the solubility to 100 min, followed by addition of bio-(1,10-decanediol diacrylate) (Arkema France) and propoxylated (3) glyceryl triacrylate (Arkema France) in the ratio 14:14 to finalize the composition for forming the polymer matrix. For comparison of the matrix components the compositions composed of different recycled polymers and biopolymers were produced and summarized in table 5. The concentration of the biopolymer is reported in % by weight based on the amount of the monofunctional monomers:

TABLE 5

| Polymer | Sample 7 |
|---|---|
| Recycled PMMA | 19 |
| Castor oil polymer | 5 |

Kitchen sinks were produced according to the process described in example 1.

Mechanical and thermal properties of the kitchen sinks from experiment 7.

TABLE 6

| Properties | Sample 7 | Comparative sink |
|---|---|---|
| Impact strength mJ/mm$^2$ | 2.7 | 2.3 |
| Scratch resistance | + | + |
| Taber abrasion, g | 16 | 12 |
| Heat resistance* | + | + |
| Temperature change stability** | + | + |

We claim:
1. A heat-curable biobased casting composition, comprising
  (a) a mixture of two or more monofunctional acrylic and/or methacrylic monomers, wherein one or more monomers are derived from recycled material and one or more monomers are plant-based or of animal origin,
  (b) one or more polyfunctional acrylic and/or methacrylic biomonomers that are plant-based or of animal origin,

(c) one or more polymers or copolymers selected from polyacrylates, polymethacrylates, polyols, polyesters derived from recycled material or plant-based or of animal origin, (d) inorganic filler particles of natural origin, wherein the proportion of the monofunctional acrylic and/or methacrylic monomers and of the polyfunctional acrylic and methacrylic biomonomers is 10-40% by weight, the proportion of the polymer (s) or copolymer (s) is 1-16% by weight and the proportion of the inorganic filler particles is 44-89% by weight, and wherein at least the non-recycled monomers, biomonomers, polymers or copolymers are non-petrochemically based.

2. The casting composition according to claim 1, wherein the weight ratio of monofunctional monomers to polyfunctional biomonomers is 2:1 to 80:1.

3. The casting composition according to claim 1, wherein the monofunctional monomers are selected from recycled acrylates and acrylates of vegetable or animal origin from the group consisting of: n-butyl acrylate, methyl acrylate, ethyl acrylate, tert-butyl acrylate, isobutyl acrylate, isodecyl acrylate, dihydrodicyclopentadienyl acrylate, ethyldiglycol acrylate, heptadecyl acrylate, 4-hydroxybutyl acrylate, 2-hydroxyethyl acrylate, hydroxyethylcaprolactone acrylate, polycaprolactone acrylate, hydroxypropyl acrylate, lauryl acrylate, stearyl acrylate, tertiobutyl acrylate, 2-(2-ethoxy) ethyl acrylate, tetrahydrofurfuryl acrylate, 2-phenoxyethyl acrylate, ethoxylated 4-phenyl acrylate, trimethylcyclohexyl acrylate, octyldecyl acrylate, tridecyl acrylate, ethoxylated 4-nonylphenol acrylate, isobornyl acrylate, cyclic trimethylolpropane formal acrylate, ethoxylated 4-lauryl acrylate, polyester acrylate, stearyl acrylate, hyperbranched polyester acrylate, melamine acrylate, silicone acrylate, epoxy acrylate, and from recycled methacrylates and methacrylates of vegetable or animal origin from the group consisting of: methyl methacrylate, ethyl methacrylate, n-butyl methacrylate, isobutyl methacrylate, tert-butyl methacrylate, behenyl methacrylate, behenyl polyethylene glycol methacrylate, cyclohexyl methacrylate, isodecyl methacrylate, 2-ethylhexyl methacrylate, lauryl methacrylate, stearyl methacrylate, stearyl polyethylene glycol methacrylate, isotridecyl methacrylate, ureido methacrylate, tetrahydrofurfuryl methacrylate, phenoxyethyl methacrylate, 3,3,5-trimethylcyclohexanol methacrylate, isobornyl methacrylate, methoxypolyethylene glycol methacrylate, glycidyl methacrylate, hexylethyl methacrylate, glycerol formal methacrylate, lauryl tetradecyl methacrylate, C17, 4-methacrylate.

4. The casting composition according to claim 1, wherein the polyfunctional biomonomer (s) are selected from acrylates of vegetable or animal origin from the group consisting of: 1, 6-hexanediol diacrylate, polyethylene glycol diacrylate, tetraethylene glycol diacrylate, tripropylene glycol diacrylate, polybutadiene diacrylate, 3-methyl-1, 5-pentanediol diacrylate, ethoxylated bisphenol A diacrylate, dipropylene glycol diacrylate, ethoxylated hexanediol diacrylate, 1, 10-decanediol diacrylate, esterdiol diacrylate, alkoxylated diacrylate, tricyclodecane dimethanol diacrylate, propoxylated neopentyl glycol diacrylate, pentaerythritol tetraacrylate, trimethylolpropane triacrylate, ditrimethylolpropane tetraacrylate, tris (2-hydroxyethyl) isocyanurate triacrylate, dipentaerythritol pentaacrylate, ethoxylated trimethylolpropane triacrylate, pentaerythritol triacrylate, propoxylated trimethylolpropane triacrylate, ethoxylated pentaerythritol tetraacrylate, propoxylated glyceryl triacrylate, aliphatic urethane acrylate, aliphatic urethane hexaacrylate, aliphatic urethane triacrylate, aromatic urethane diacrylate, aromatic urethane triacrylate, aromatic urethane hexaacrylate, polyester hexaacrylate, epoxidized soybean oil diacrylate, and from polyfunctional methacrylates of vegetable or animal origin from the group consisting of: triethylene glycol dimethacrylate, ethylene glycol dimethacrylate, polyethylene glycol dimethacrylate, 1, 4-butanediol dimethacrylate, diethylene glycol dimethacrylate 1, 6-hexanediol dimethacrylate, 1, 10-decanediol dimethacrylate, 1,3-butylene glycol dimethacrylate, ethoxylated bisphenol A dimethacrylate, tricyclodecanedimethanol dimethacrylate, trimethylolpropane trimethacrylate.

5. The casting composition according to claim 1, wherein the weight ratio of mono- and polyfunctional acrylates and/or methacrylates to the polymer (s) or copolymer (s) is 90:10 to 60:40, preferably 85:15 to 70:30.

6. The casting composition according to claim 1, the inorganic filler particles are selected from $SiO_2$, $Al_2O_3$, $TiO_2$, $ZrO_2$, $Fe_2O_3$, $Zno$, $Cr_2O_5$, carbon, metals or metal alloys.

7. The casting composition according to claim 1, wherein the inorganic filler particles have a particle size of 0.010 to 8000 μm.

8. The casting composition according to claim 1, wherein the inorganic fillers have an aspect ratio of length to width of 1.0 to 1000 (length: width of the individual particles).

9. The casting composition according to claim 1, wherein the casting composition has a viscosity which allows injection into a mold.

10. A shaped article produced using a casting composition according to claim 1.

11. The shaped article according to claim 10, wherein the shaped article is a kitchen sink, a shower tray, a washstand, a bathtub, a worktop or a floor, wall or ceiling panel.

12. A process for producing a shaped article, in which a casting composition according to claim 1 is introduced into a mold in which it polymerizes at a temperature elevated relative to room temperature and the polymerized shaped article is subsequently removed from the mold and cooled.

13. The process according to claim 12, wherein the temperature during the polymerization is between 60-140° C., preferably between 75-130° ° C. and in particular 80-110° C.

14. The process according to claim 12, wherein the holding time during which the casting composition remains in the mold for polymerization is between 15-50 min, preferably 20-45 min and in particular 25-35 min.

15. The casting composition according to claim 2, wherein the weight ratio of monofunctional monomers to polyfunctional biomonomers is 4:1 to 70:1.

16. The casting composition according to claim 15, wherein the weight ratio of monofunctional monomers to polyfunctional biomonomers is 5:1 to 60:1.

17. The casting composition according to claim 7, wherein the inorganic filler particles have a particle size of 0.05 to 3000 μm.

18. The casting composition according to claim 17, wherein the inorganic filler particles have a particle size of 0.1 to 1300 μm.

19. The casting composition according to claim 1, wherein the recycled materials are non-petrochemically based.

* * * * *